Oct. 4, 1955        L. B. SALM        2,719,378
FISHING LURE
Filed Nov. 12, 1952
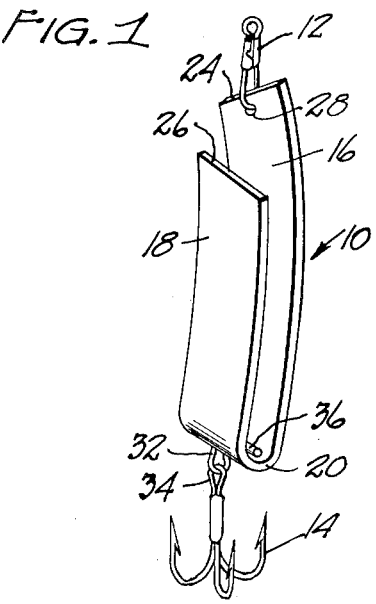
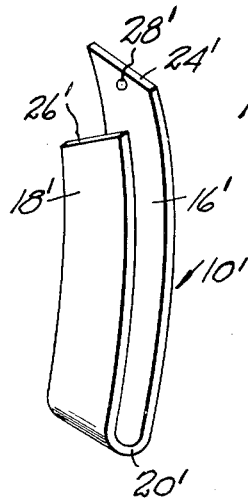
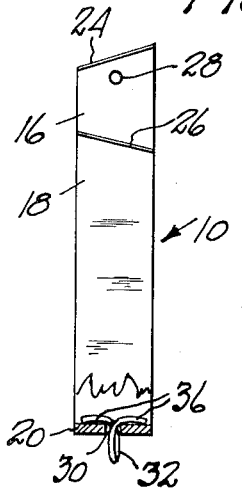
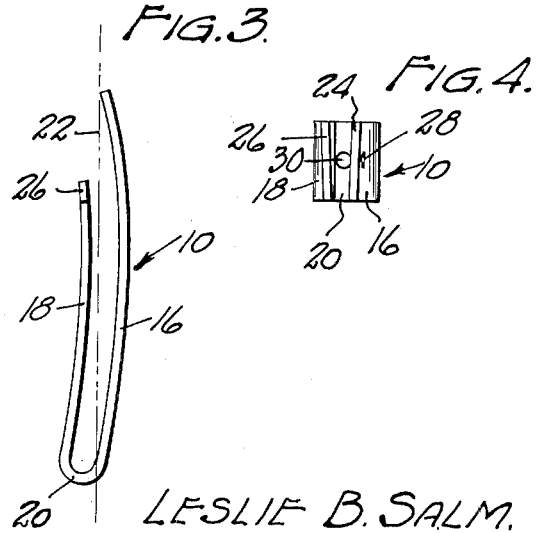
LESLIE B. SALM,
INVENTOR.
BY Eugene C. Knoblock
ATTORNEY.

United States Patent Office 2,719,378
Patented Oct. 4, 1955

2,719,378

FISHING LURE

Leslie B. Salm, Lake Arrowhead, Calif., assignor to South Bend Bait Company, South Bend, Ind., a corporation of Indiana Application November 12, 1952, Serial No. 320,017

16 Claims. (Cl. 43—42.5)

This invention relates to improvements in fishing lures.

The primary object of the invention is to provide a lure which is of novel construction and which has a novel action characterized by darting of the lure from side to side relative to the line of draft, and a simultaneous rocking or fluttering action of the lure body itself which avoids twisting of the fishing line by means of which the lure is drawn.

A further object is to provide a lure of this character which can be made in either right or left design so as to permit lures to be connected to lines carried by poles projecting from opposite sides of a boat during trolling with assurance that the lures will track properly the respective line attachment points of their respective tackle, and will have a desirable fish-attracting action and lively movement without danger that the two lures will move into each other's paths so as to foul or entangle the lines.

Other objects will be apparent from the following specification.

In the drawing:

Fig. 1 is a perspective view of one embodiment of the lure.

Fig. 2 is a face view of the lure body with parts broken away.

Fig. 3 is a side view of the lure body, the hook and the connecting eyelet being removed.

Fig. 4 is an end view of the lure body as viewed from the top in Fig. 3.

Fig. 5 is a perspective view of a lure body constituting a modified embodiment of the invention.

Referring to Figs. 1 to 4, inclusive, of the drawing which illustrates the preferred embodiment of the invention, the numeral 10 designates the body of a lure which is provided with a suitable line attachment means 12 at one end and a hook 14 at its opposite end.

The lure body or blade 10 is preferably formed from an elongated strip of metal which is preferably substantially flat transversely and is substantially of uniform width throughout its length, although the shape of the body may be such as to permit at least some measure of departure from conditions of transverse flatness and uniform width. The body is preferably of substantially U-shape, having a long blade portion 16, a comparatively short blade portion 18, and an integral curved portion or bight portion 20 connecting said blade portions. The short blade portion 18 is preferably of a length greater than one-half of the length of the long blade portion 16 and, in the preferred embodiment of the invention, will be of a length approximately three-quarters of the length of the long blade portion 16. Both blade portions 16 and 18 are bent longitudinally and substantially arcuately, the curvature of the two blade portions being similar so that the blade portions are substantially uniformly spaced throughout their length. The curvature is small and preferably will be less than the spacing between the blade portions. In other words, a chord of the curvature of the long blade portion 16 taken across its inner face, as illustrated by the line 22 in Fig. 3, will be spaced from the inner convex surface of the short blade portion 18. The curvature will preferably be substantially uniform, that is, will be substantially arcuate.

The dimensions of the body may vary according to the size and weight of the lure which is desired. Thus, a fly rod lure may be formed from stock which is approximately $9/32$ of an inch wide and the maximum length of the blade portion 16 of which is approximately $1^{15}/_{32}$ of an inch from the tip of the free edge of the blade portion to the outer surface of the center of the bight 20. The dimension of the short blade portion from its longest tip to the center of the outer surface of the bight 20 may be in the order of $1\frac{1}{8}$ of an inch. The stock used will be plate stock of any suitable gauge capable of retaining its shape and resisting deforming thereof. The blade portions are spaced apart less than their width.

The bight or bent portion 20 is formed so that said blade portions are spaced apart substantially uniformly throughout their length as seen in Fig. 3, and are located with their corresponding edges substantially in registration, as illustrated in Fig. 2. The end edges of the blade portions extend diagonally thereof, and each thereof extends oppositely of the other. The angular relation of each edge to the longitudinal axis or side edges of the device preferably is substantially the same. In the preferred embodiment of the invention the edges 24 and 26 will extend at angles between 70 and 75 degrees from the longitudinal axis of the body. This angle is illustrative, however, and may be either greater or less, but best results are secured in the range of angles between 60 and 80 degrees.

The blade portion 16 has an aperture 28 formed therein adjacent to its outer edge 24 and centrally between its side edges. The aperture is spaced a substantial distance beyond or longitudinally from the end edge 26 of the short blade portion 18. This aperture receives and mounts a line-attaching member 12 which has here been illustrated as a device having a safety latch.

The bight portion 20 of the lure body is provided with a central aperture 30 which mounts an eyelet 32 for swiveled or pivoted connection with the eye portion 34 of a fish hook 14. The fish hook 14 is here illustrated as being of the treble hook type, but it will be understood that the hook may be of any other suitable type. The hook-attaching eyelet 32 is formed from wire and has leg or end portions 36 which are bent therefrom to extend laterally of the body at the interior of the bight 20, as shown. The shape of the eyelet 32 and its legs 36, and the snugness of the fit thereof in the aperture 30, are such that the eyelet is retained in place by its shape or contour.

It will be observed that the line of draft of the lure extends substantially longitudinally of the blade portion 16 but that a portion of the blade portion 16 projects to one side of that line of draft as illustrated by the dot and dash line in Fig. 3. The blade portion 18 is entirely located at the opposite side of this line of draft. These factors, coupled with the longitudinal curvature of the two blade portions and the angles at which their ends or leading edges 24 and 26 are displaced relative to the longitudinal dimensions of the blade portions, cooperate to produce a novel and distinctive reaction as the lure body is drawn through the water. This action is characterized by alternate rapid darting of the lure body, first in one direction and then in the opposite direction relative to the direction of travel of the lure. Stated differently, the lure does not proceed directly in the direction in which it is drawn by the line, but travels in a direction at an angle to the direction in which the line extends, and this angular direction changes alternately in an interesting manner, the curvature of the body assisting in the change of direction.

The lure body has a rocking or fluttering action as it moves and, in cases where the body is formed from a light-reflecting material, such as polished metal, the lure has a sparkling appearance as it moves through the water and reflects sunlight. The rocking action is to be distinguished from a rotative action, and one of the important characteristics of the device is that it will not rotate in the water to an extent producing objectionable or even noticeable twisting of the line.

One of the interesting characteristics of the device is its action in trolling when attached to a rod projecting laterally from the side of a boat. The lures may be made in rights and lefts, depending upon the angle at which the end edges 24 and 26 are shaped. Thus the lure may be shaped as illustrated in Fig. 5 with the end edge 24' of the blade portion 16' extending at an angle equal to but opposite to the angle of the edge 24 of the blade potrion 16 in the Fig. 1 embodiment, and, likewise, the end edge 26' of the blade portion 18' of Fig. 5 may extend oppositely to the edge 26 of the blade as illustrated in Fig. 1.

One of these lures would be particularly suited for attachment to a rod projecting from the right-hand side of a boat, and the other would be particularly suited for attachment to the rod projecting from the left-hand side of a boat. When properly selected, these lures would tend to travel in their individual paths with the darting and rocking action described above and in such a manner as to avoid interference with one another, even when connected at the ends of long lines so that only a comparatively slight angular displacement would tend to cause them to travel in the paths of each other with resultant danger of entanglement of the lines. In other words, while the lures do dart laterally, the darting action is of small amplitude and, when proper lures are chosen for trolling from opposite sides of the boat, they will not interfere with each other.

The material of which the lure is formed will preferably be of metal, such as brass, and the lure may be painted or decorated to give any decorative appearance desired. Also, the lure may be formed of other material, such as synthetic resin, provided that such materials are sufficiently rigid to maintain their shape and the desired spacing of the blade portions as the same are subjected to the reaction of water thereagainst in use.

It will be understood that the size of the lure may vary as desired. Thus the lure may be used in small sizes for use with fly casting rods, or it may be used in larger sizes for attachment to bait casting rods, and it may be manufactured in still larger sizes suitable for use in salt water fishing. The weight of the lure, of course, will vary with its size and, similarly, all dimensions of the lures will vary with different sizes and proportionally to differences in over-all sizes.

It will be understood that various decorative touches may be applied to the lure, such as different colors or different patterns or designs applied to the surfaces of the blade portions, or simulations of eyes or the like may be applied.

While the preferred embodiment of the invention has been illustrated and described, it will be understood that changes in the construction may be made within the scope of the appended claims without departing from the spirit of the invention.

I claim:

1. A fishing lure comprising a body formed of two elongated rigid blade portions interconnected at one end by an integral bight portion, said blade portions being curved longitudinally and spaced apart substantially uniformly throughout their length, one blade portion being longer than the other, line-attaching means secured to the long blade portion centrally between its side edges and longitudinally spaced from the end of the short blade portion, and a hook pivotally connected to said body at the center of said bight portion.

2. A fishing lure comprising a body formed of two elongated rigid blade portions interconnected at one end by an integral bight portion, said blade portions being curved longitudinally and spaced apart substantially uniformly throughout their length, one blade portion being longer than the other, line-attaching means secured to the long blade portion centrally between its side edges and longitudinally spaced from the end of the short blade portion, and a hook pivotally connected to said body at the center of said bight portion, said blade portions having free end edge portions extending diagonally of the length of said blade portions and in opposite directions.

3. A fishing lure comprising a body formed of two elongated rigid blade portions interconnected at one end by an integral bight portion, said blade portions being curved longitudinally and spaced apart substantially uniformly throughout their length, one blade portion being longer than the other, line-attaching means secured to the long blade portion centrally between its side edges and longitudinally spaced from the end of the short blade portion, and a hook pivotally connected to said body at the center of said bight portion, said blade portions being of substantially uniform and equal width.

4. A fishing lure comprising a body formed of two elongated rigid blade portions interconnected at one end by an integral bight portion, said blade portions being curved longitudinally and spaced apart substantially uniformly throughout their length, one blade portion being longer than the other, line-attaching means secured to the long blade portion centrally between its side edges and longitudinally spaced from the end of the short blade portion, and a hook pivotally connected to said body at the center of said bight portion, the curvature of said blade portions being such that the major portion of the long blade portion is located at one side of and spaced from the line of draft between said line-attaching means and said hook and such that the short blade portion is located at the opposite side of and is spaced from said line of draft.

5. A fishing lure comprising a substantially rigid plate portion having a return bend portion spaced from its longitudinal center to define a long draft blade portion and a juxtaposed shorter blade portion, said blade portions being spaced substantially uniformly and having an arcuate bend longitudinally, line-attaching means carried by the end portion of the long blade portion, and hook-attaching means carried by said return bend portion.

6. A fishing lure comprising a substantially rigid plate portion having a return bend portion spaced from its longitudinal center to define a long draft blade portion and a juxtaposed shorter blade portion, said blade portions being spaced substantially uniformly and having an arcuate bend longitudnally, line-attaching means carried by the end portion of the long blade portion, and hook-attaching means carried by said return bend portion, said blade portions being spaced apart a distance less than the width thereof.

7. A fishing lure comprising a substantially rigid plate portion having a return bend portion spaced from its longitudinal center to define a long draft blade portion and a juxtaposed shorter blade portion, said blade portions being spaced substantially uniformly and having an arcuate bend longitudinally, line-attaching means carried by the end portion of the long blade portion, and hook-attaching means carried by said return bend portion, said short blade portion being of a length greater than one-half the length of the long blade portion.

8. A fishing lure comprising a substantially rigid plate portion having a return bend portion spaced from its longitudinal center to define a long draft blade portion and a juxtaposed shorter blade portion, said blade portions being spaced substantially uniformly and having an arcuate bend longitudinally, line-attaching means carried by the end portion of the long blade portion, and hook-attaching means carried by said return bend portion, said blade portions having their end edges extending diagonally oppositely.

9. A fishing lure comprising a substantially rigid plate portion having a return bend portion spaced from its longitudinal center to define a long draft blade portion and a juxtaposed shorter blade portion, said blade portions being spaced substantially uniformly and having an arcuate bend longitudinally, line-attaching means carried by the end portion of the long blade portion, and hook-attaching means carried by said return bend portion, said blade portions having their end edges extending diagonally in oppositely inclined relation to each other and at an angle to the longitudinal axis of the blade portion in the range between 60 degrees and 80 degrees.

10. A fishing lure comprising an elongated body having a pair of substantially uniformly spaced rigid blade portions each free at one end and a portion interconnecting said blade portions at the other end thereof, hook-attaching means carried by said interconnecting portion, and line-attaching means provided at the free end of one blade portion whereby said body is pulled through the water substantially endwise with said interconnecting portion located at the rear of the body and extending substantially transversely of the line of pull.

11. A fishing lure as defined in claim 10, wherein said interconnecting portion is of substantially the same width as said blade portions.

12. A fishing lure as defined in claim 10, wherein said rigid blade portions are elongated and have their free ends spaced apart and positioned foremost.

13. A fishing lure as defined in claim 10, wherein said transverse portion serves as a water resistance element located at the trailing end of the body.

14. A fishing lure as defined in claim 10, wherein the rigid blade portions are elongated and at least the major parts of the length of said blade portions extend at opposite sides of a line of draft extending between said line-attaching means and said hook-attaching means.

15. A fishing lure as defined in claim 10, wherein said blade portions have end edges extending diagonally and in opposite directions.

16. A fishing lure comprising a rigid body having an elongated first blade portion, a connecting portion and a second blade portion, said connecting portion projecting laterally from one end of said first arm, line-attaching means connected at the end of said first portion opposite said connecting portion, said second blade portion being elongated and projecting forwardly from said connecting portion opposite to and spaced substantially uniformly from said first arm, and hook-attaching means provided at the rear of said body.

References Cited in the file of this patent

UNITED STATES PATENTS

| | | |
|---|---|---|
| 609,486 | Wilson | Aug. 23, 1898 |
| 1,362,586 | Ackerman | Dec. 21, 1920 |
| 1,621,008 | Fricker | Mar. 15, 1927 |

FOREIGN PATENTS

| | | |
|---|---|---|
| 4,883 | Great Britain | 1891 |
| 16,718 | Great Britain | 1910 |